United States Patent
Naserian et al.

(10) Patent No.: US 12,269,314 B2
(45) Date of Patent: Apr. 8, 2025

(54) DETECTING AND MITIGATING WINDOW CONDENSATION

(71) Applicant: GM Global Technology Operations LLC, Detroit, MI (US)

(72) Inventors: Mohammad Naserian, Windsor (CA); Allan Kenneth Lewis, Windsor (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 387 days.

(21) Appl. No.: 17/841,883

(22) Filed: Jun. 16, 2022

(65) Prior Publication Data

US 2023/0406063 A1    Dec. 21, 2023

(51) Int. Cl.
*B60H 1/00* (2006.01)
*B60S 1/02* (2006.01)

(52) U.S. Cl.
CPC ....... *B60H 1/00785* (2013.01); *B60H 1/0073* (2019.05); *B60H 1/00871* (2013.01); *B60S 1/023* (2013.01)

(58) Field of Classification Search
None
See application file for complete search history.

(56) References Cited

U.S. PATENT DOCUMENTS

| 2012/0142264 | A1* | 6/2012 | Sagou | B60H 1/00842 454/75 |
| 2017/0240138 | A1* | 8/2017 | Mori | H04N 7/183 |
| 2017/0359860 | A1* | 12/2017 | Howe | G01R 31/44 |
| 2018/0272946 | A1* | 9/2018 | Worthen | G01D 5/34 |
| 2019/0377175 | A1* | 12/2019 | Han | H05B 1/0288 |
| 2021/0023914 | A1 | 1/2021 | Warey et al. | |
| 2022/0105781 | A1* | 4/2022 | Salter | G06V 20/59 |

FOREIGN PATENT DOCUMENTS

| DE | 102015113574 A1 | 2/2016 |
| DE | 102018106735 A1 | 2/2019 |
| DE | 102018128298 A1 | 5/2019 |
| DE | 102020124989 A1 | 4/2021 |
| DE | 102021001047 A1 | 4/2021 |
| DE | 102021125586 A1 | 4/2022 |

* cited by examiner

*Primary Examiner* — Todd Melton
*Assistant Examiner* — Jason R Roberson
(74) *Attorney, Agent, or Firm* — Vivacqua Crane, PLLC

(57) ABSTRACT

A system for detecting and mitigating window condensation for a vehicle includes an interior camera and a heating, ventilation, and air conditioning (HVAC) system. The system also includes a controller in electrical communication with the interior camera and the HVAC system. The controller is programmed to determine an opacity of a first window of the vehicle using the interior camera, compare the opacity of the first window to an opacity threshold, and adjust the HVAC system to decrease the opacity of the first window of the vehicle in response to determining that the opacity of the first window is greater than or equal to the opacity threshold.

10 Claims, 3 Drawing Sheets

DETECTING AND MITIGATING WINDOW CONDENSATION

INTRODUCTION

The present disclosure relates to a system and method for detecting and mitigating window condensation in a vehicle.

Condensation forming on windows of a vehicle may obstruct the driver's field of view of the environment outside of the vehicle, leading to increased probability of a collision. Condensation may form on the windows of the vehicle due to various factors, including air temperature and humidity outside of the vehicle, air temperature and humidity inside of the vehicle, and temperature of an interior and/or exterior surface of the windows. Systems and methods have been developed to mitigate the formation of condensation on windows of vehicles. For example, heating, ventilation, and air conditioning (HVAC) systems may be designed to direct airflow to the interior surface of windows of the vehicle. HVAC systems often require input and adjustment from the driver to effectively mitigate window condensation. Additionally, environmental factors inside and/or outside of the vehicle may result in unbalanced buildup of condensation across multiple windows of the vehicle.

Thus, while current systems and methods for mitigating window condensation achieve their intended purpose, there is a need for a new and improved system and method for detecting and mitigating window condensation in a vehicle.

SUMMARY

According to several aspects, a system for detecting and mitigating window condensation for a vehicle is provided. The system includes an interior camera and a heating, ventilation, and air conditioning (HVAC) system. The system also includes a controller in electrical communication with the interior camera and the HVAC system. The controller is programmed to determine an opacity of a first window of the vehicle using the interior camera, compare the opacity of the first window to an opacity threshold, and adjust the HVAC system to decrease the opacity of the first window of the vehicle in response to determining that the opacity of the first window is greater than or equal to the opacity threshold.

In another aspect of the present disclosure, to determine the opacity of the first window, the controller is further programmed to record an image of the first window of the vehicle using the interior camera and determine the opacity of the first window of the vehicle using the image and a machine learning algorithm.

In another aspect of the present disclosure, to adjust the HVAC system, the controller is further programmed to monitor the opacity of the first window over time and adjust at least one of: an air temperature of the HVAC system and an airflow within the HVAC system in response to determining that the opacity of the first window is increasing.

In another aspect of the present disclosure, to adjust the HVAC system, the controller is further programmed to increase an airflow to the first window using the HVAC system.

In another aspect of the present disclosure, to increase airflow to the first window, the controller is further programmed to increase a fan speed of the HVAC system.

In another aspect of the present disclosure, to increase airflow to the first window, the controller is further programmed to direct the airflow to the first window using the HVAC system.

In another aspect of the present disclosure, to direct the airflow to the first window, the controller is further programmed to identify a first HVAC outlet, where the first HVAC outlet is configured to provide airflow to the first window and increase an airflow to the first HVAC outlet using the HVAC system. To direct the airflow to the first window, the controller is further programmed to determine an opacity of a second window of the vehicle and compare the opacity of the second window to the opacity threshold. To direct the airflow to the first window, the controller is further programmed to identify a second HVAC outlet, where the second HVAC outlet is positioned provide airflow to the second window and decrease an airflow to the second HVAC outlet using the HVAC system in response to determining that the opacity of the second window is less than the opacity threshold.

In another aspect of the present disclosure, to direct the airflow to the first window, the controller is further programmed to calculate a first difference between the opacity of the first window and the opacity threshold and set the airflow to the first HVAC outlet proportionally to the first difference in response to determining that the opacity of the second window is greater than or equal to the opacity threshold. To direct the airflow to the first window, the controller is further programmed to calculate a second difference between the opacity of the second window and the opacity threshold and set the airflow to the second HVAC outlet proportionally to the second difference in response to determining that the opacity of the second window is greater than or equal to the opacity threshold.

In another aspect of the present disclosure, the system further includes a rear window heating element, and the controller is further programmed to determine an opacity of a rear window of the vehicle using the interior camera. The controller is further programmed to compare the opacity of the rear window to the opacity threshold and activate the rear window heating element in response to determining that the opacity of the rear window is greater than or equal to the opacity threshold.

In another aspect of the present disclosure, the system further includes a side mirror heating element, and the controller is further programmed to determine a reflectivity of a side mirror of the vehicle using the interior camera and compare the reflectivity of the side mirror to a reflectivity threshold. The controller is further programmed to activate the side mirror heating element in response to determining that the reflectivity of the side mirror is less than or equal to the reflectivity threshold.

According to several aspects, a method for detecting and mitigating window condensation for a vehicle is provided. The method includes determining an opacity of a first window using an interior camera, comparing the opacity of the first window to an opacity threshold, and adjusting an HVAC system to decrease the opacity of the first window in response to determining that the opacity of the first window is greater than or equal to the opacity threshold.

In another aspect of the present disclosure, determining the opacity of the first window further may include recording an image of the first window using the interior camera and determining the opacity of the first window using the image and a machine learning algorithm.

In another aspect of the present disclosure, adjusting the HVAC system further may include increasing an airflow to the first window using the HVAC system.

In another aspect of the present disclosure, adjusting the HVAC system further may include directing the airflow to the first window using the HVAC system.

In another aspect of the present disclosure, directing the airflow further may include identifying a first HVAC outlet, where the first HVAC outlet is configured to provide airflow to the first window, increasing an airflow to the first HVAC outlet using the HVAC system, and determining an opacity of a second window. Directing the airflow further may include comparing the opacity of the second window to the opacity threshold, identifying a second HVAC outlet, where the second HVAC outlet is positioned provide airflow to the second window, and decreasing an airflow to the second HVAC outlet using the HVAC system in response to determining that the opacity of the second window is less than the opacity threshold.

In another aspect of the present disclosure, directing the airflow further may include calculating a first difference between the opacity of the first window and the opacity threshold and setting the airflow to the first HVAC outlet proportionally to the first difference in response to determining that the opacity of the second window is greater than or equal to the opacity threshold. Directing the airflow further may include calculating a second difference between the opacity of the second window and the opacity threshold and setting the airflow to the second HVAC outlet proportionally to the second difference in response to determining that the opacity of the second window is greater than or equal to the opacity threshold.

In another aspect of the present disclosure, the method further includes determining an opacity of a rear window of the vehicle using the interior camera, comparing the opacity of the rear window to the opacity threshold, and activating a rear window heating element in response to determining that the opacity of the rear window is greater than or equal to the opacity threshold. The method further includes determining a reflectivity of a side mirror of the vehicle using the interior camera, comparing the reflectivity of the side mirror to a reflectivity threshold, and activating a side mirror heating element in response to determining that the reflectivity of the side mirror is less than or equal to the reflectivity threshold.

According to several aspects, a system for detecting and mitigating window condensation for a vehicle is provided. The system includes an interior camera, a heating, ventilation, and air conditioning (HVAC) system, a rear window heating element, and a side mirror heating element. The system also includes a controller in electrical communication with the interior camera, the HVAC system, the rear window heating element, and the side mirror heating element. The controller is programmed to record an image of a first window of the vehicle using the interior camera, determine an opacity of the first window of the vehicle using the image and a machine learning algorithm, compare the opacity of the first window to an opacity threshold, and adjust the HVAC system to decrease the opacity of the first window of the vehicle in response to determining that the opacity of the first window is greater than or equal to the opacity threshold. The controller is further programmed to determine an opacity of a rear window of the vehicle using the interior camera, compare the opacity of the rear window to the opacity threshold, and activate the rear window heating element in response to determining that the opacity of the rear window is greater than or equal to the opacity threshold. The controller is further programmed to determine a reflectivity of a side mirror of the vehicle using the interior camera, compare the reflectivity of the side mirror to a reflectivity threshold, and activate the side mirror heating element in response to determining that the reflectivity of the side mirror is less than or equal to the reflectivity threshold.

In another aspect of the present disclosure, to adjust the HVAC system to decrease the opacity of the first window, the controller is further programmed to identify a first HVAC outlet, where the first HVAC outlet is configured to provide airflow to the first window, increase an airflow to the first HVAC outlet using the HVAC system. To adjust the HVAC system to decrease the opacity of the first window, the controller is further programmed to determine an opacity of a second window of the vehicle, compare the opacity of the second window to the opacity threshold, identify a second HVAC outlet, where the second HVAC outlet is positioned provide airflow to the second window, and decrease an airflow to the second HVAC outlet using the HVAC system in response to determining that the opacity of the second window is less than the opacity threshold.

In another aspect of the present disclosure, to adjust the HVAC system to decrease the opacity of the first window, the controller is further programmed to calculate a first difference between the opacity of the first window and the opacity threshold and set the airflow to the first HVAC outlet proportionally to the first difference in response to determining that the opacity of the second window is greater than or equal to the opacity threshold. To adjust the HVAC system to decrease the opacity of the first window, the controller is further programmed to calculate a second difference between the opacity of the second window and the opacity threshold and set the airflow to the second HVAC outlet proportionally to the second difference in response to determining that the opacity of the second window is greater than or equal to the opacity threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
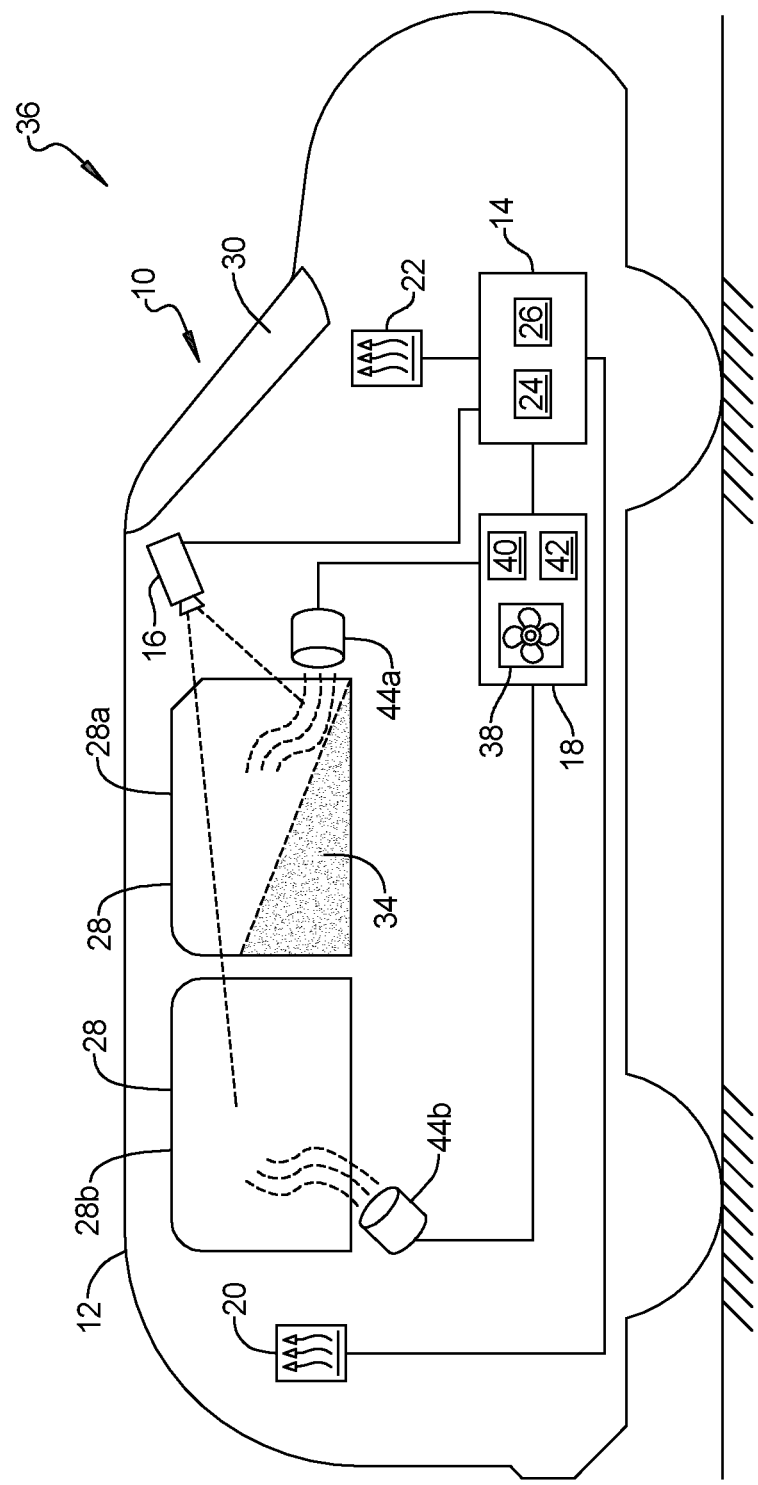
FIG. 1 is a schematic diagram of a system for detecting and mitigating window condensation according to an exemplary embodiment.

Referring to FIG. 1, a system for detecting and mitigating window condensation for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, an interior camera 16, a heating, ventilation, and air conditioning (HVAC) system 18, a rear window heating element 20, and a side mirror heating element 22.

The controller 14 is programmed to implement a method 100 for detecting and mitigating window condensation for a vehicle, as will be described below. The controller 14 includes at least one processor 24 and a non-transitory computer readable storage device or media 26. The processor 24 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 26 may include volatile and non-volatile storage in read-only memory (ROM), random-access memory (RAM), and keep-alive memory (KAM), for example. KAM is a persistent or non-volatile memory that may be used to store various operating variables while the processor 24 is powered down. The computer-readable storage device or media 26 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other.

The controller 14 is in electrical communication with the interior camera 16, the HVAC system 18, the rear window heating element 20, and the side mirror heating element 22. The electrical communication is established using, for example, a CAN bus, a WiFi network, a cellular data network, or the like. One skilled in the art will appreciate that various additional wired and wireless techniques and communication protocols may be used to communicate with the controller 14.

The interior camera 16 is used to record images of windows 28, a windscreen 30, and a rear window 32 of the vehicle 12. The windows 28 include a front driver's side window 28a and a front passenger's side window 28b. The windows 28 may also include rear passenger windows or other windows without departing from the scope of the present disclosure. The images are used by the controller 14 to determine an opacity of the windows 28. The interior camera 16 includes an array of multiple cameras without departing from the scope of the present disclosure. The interior camera 16 is in electrical communication with the controller 14 as described above.

In the present disclosure, the term condensation 34 refers to moisture which condenses on an interior or exterior surface of the windows 28 and/or windscreen 30. For example, moisture may obstruct the driver's field of view by condensing on the interior surface of the windows 28, such that the condensate increases an opacity of the windows 28. In another example, moisture on the exterior surface of the windscreen 30 may freeze, forming ice crystals which increase the opacity of the windscreen 30.

The HVAC system 18 is used to control airflow within an interior of the vehicle 12. The HVAC system 18 is used to improve driver comfort by regulating temperature and humidity inside of the vehicle 12. The HVAC system 18 is further used to improve driver safety by directing airflow to windows 28 and windscreen 30 of the vehicle 12 to prevent the driver's field of view of an environment 36 outside of the vehicle 12 from being obstructed by condensation 34 as described above. By using the HVAC system 18 to direct airflow to the windows 28 and/or windscreen 30 which is obstructed by condensation 34, a temperature of the interior and/or exterior surface of the windows 28 and/or windscreen 30 may be adjusted to remove the condensation 34.

In an exemplary embodiment, the HVAC system 18 includes a blower 38, air baffles 40, a temperature control 42, and HVAC outlets 44a, 44b. The blower 38 is an electrically driven fan which generates the airflow in the HVAC system 18 by increasing or decreasing the speed of the blower 38. The air baffles 40 are electrically actuated surfaces within the HVAC system 18 which are used to direct the airflow within the HVAC system 18. By moving the air baffles 40, the HVAC system 18 may control a proportion of a total volume of the airflow generated by the blower 38 which is directed to each of the HVAC outlets 44a, 44b. The temperature control 42 allows the HVAC system 18 to control a temperature of the airflow in the entire HVAC system 18. The HVAC outlets 44a, 44b provide the airflow to the interior of the vehicle 12. In an exemplary embodiment, the HVAC outlets 44a, 44b are configured to provide airflow to occupants of the vehicle 12 to improve occupant comfort. In the exemplary embodiment depicted in FIG. 1, the HVAC outlets 44a, 44b are configured to provide airflow to the windows 28 of the vehicle 12 for the purpose of reducing obstruction of the driver's field of view due to condensation 34.

The HVAC system 18 is in electrical communication with the controller 14 as described above. The blower 38, air baffles 40, and temperature control 42 of the HVAC system 18 may be controlled automatically by the controller 14, or in response to an input by an occupant of the vehicle 12 to a human-machine interface (not shown).

The rear window heating element 20 is used to heat the rear window 32 (shown in FIG. 2) of the vehicle 12. In an exemplary embodiment, the rear window heating element 20 is a resistive heating element adhered to an interior surface of the rear window 32. The rear window heating element 20 is in electrical communication with the controller 14 as described above.

The side mirror heating element 22 is used to heat a side mirror 46 (shown in FIG. 2) of the vehicle 12. In an exemplary embodiment, the side mirror heating element 22 is a resistive heating element contained within the side mirror 46. The side mirror heating element 22 is in electrical communication with the controller 14 as described above.

Figure 2:
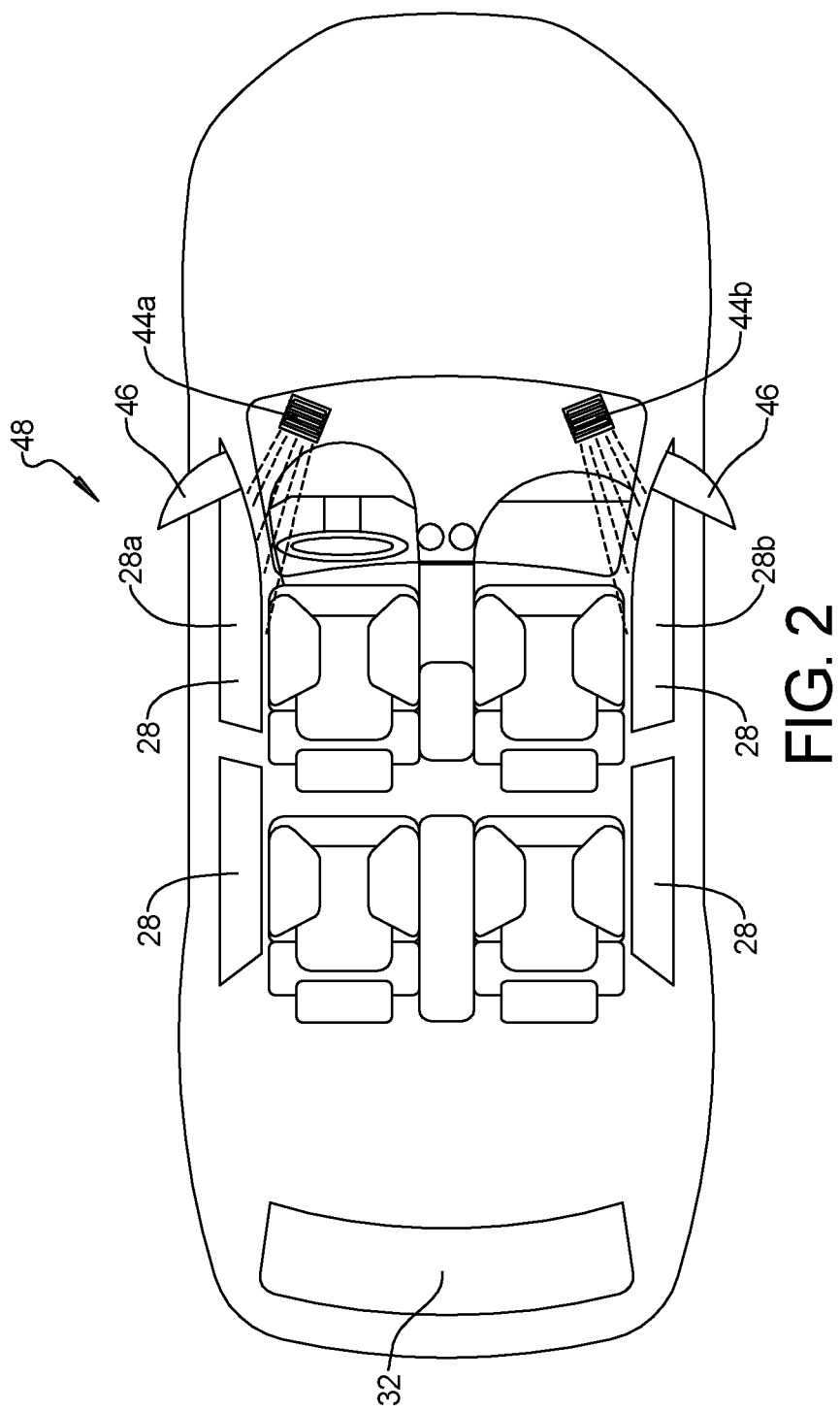
FIG. 2 is a view of an interior of a vehicle according to an exemplary embodiment.

Referring to FIG. 2, a view from a perspective of the interior camera 16 according to an exemplary embodiment is illustrated and generally indicated by reference number 48. The interior camera 16 is positioned such that the windows 28 the windscreen 30, the rear window 32, and the side mirrors 46 are within the perspective of the interior camera 16. As discussed above, in the exemplary embodiment shown in FIGS. 1 and 2, the HVAC outlets 44a, 44b are configured to provide airflow to the windows 28. Therefore, when air flows out of the HVAC outlets 44a, 44b, airflow is provided to the windows 28, thus adjusting the temperature of the interior and/or exterior surface of the windows 28 as discussed above. In another exemplary embodiment, each of the windows 28 of the vehicle 12 may be monitored individually by the system 10. Each of the windows 28 has HVAC outlets configured to provide airflow to the windows 28.

Figure 3:
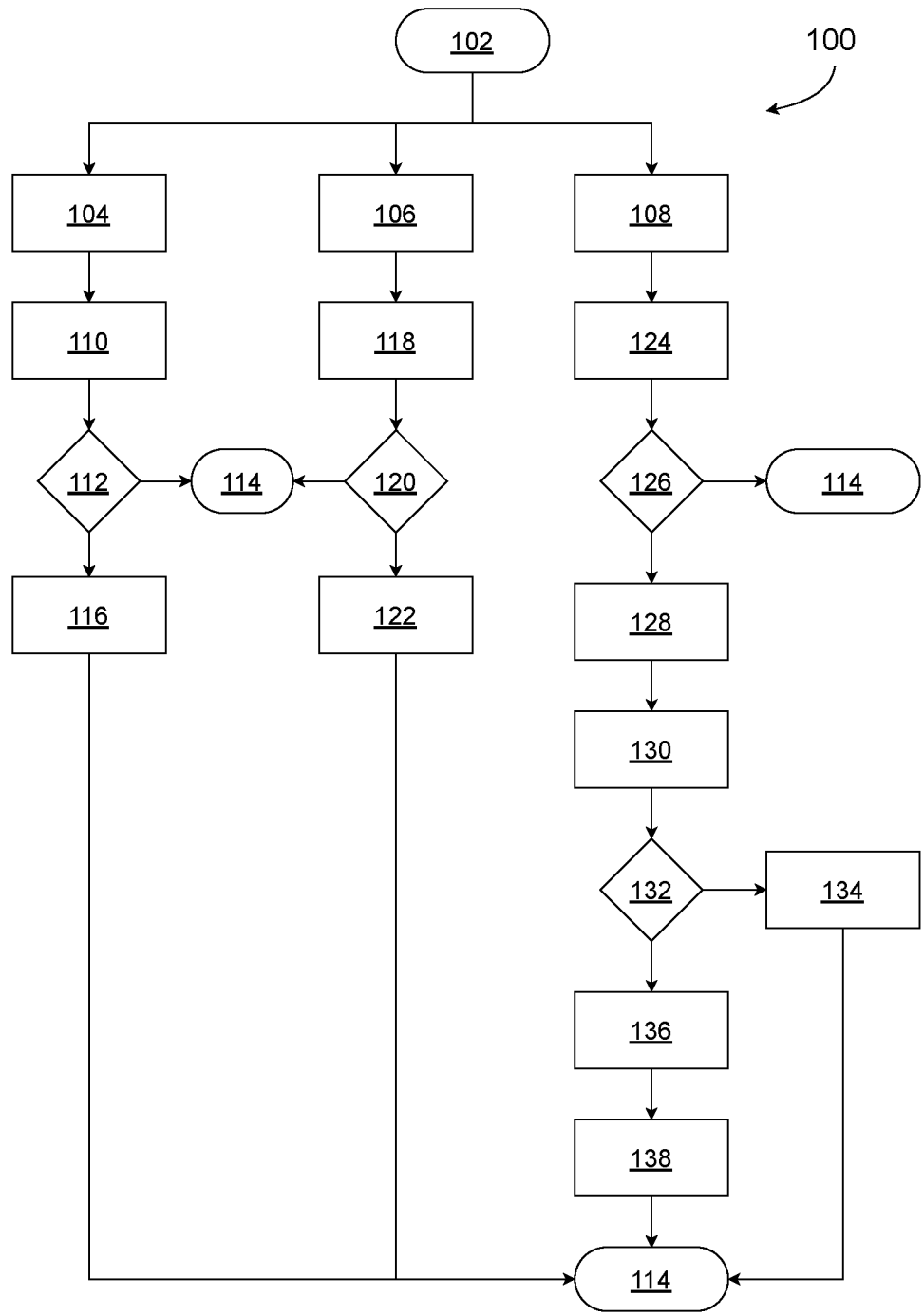
FIG. 3 is a flowchart of a method for detecting and mitigating window condensation according to an exemplary embodiment.

Referring to FIG. 3, a flowchart of the method 100 for detecting and mitigating window condensation for a vehicle is shown. The method 100 begins at block 102 and proceeds to blocks 104, 106, and 108.

At block 104, the interior camera 16 records an image of the rear window 44 of the vehicle 12. The method 100 then proceeds to block 110.

At block 110, the controller 14 processes the image of the rear window 44 to determine an opacity of the rear window 44. In an exemplary embodiment, to determine the opacity of the rear window 44, the controller 14 uses a machine learning algorithm. In a non-limiting example, the machine learning algorithm is trained by providing the algorithm with a plurality of images of windows with known opacity. For example, the plurality of images includes windows of various shapes, sizes, and colors, with various backgrounds visible through the windows, obstructed to various degrees by condensation 34. After sufficient training of the machine learning algorithm, the algorithm can determine the opacity of windows from images recorded using the interior camera 16 with a high accuracy and precision. After block 110, the method 100 proceeds to block 112.

At block 112, the opacity of the rear window 44 determined at block 110 is compared to a first opacity threshold. The first opacity threshold is an opacity above which a window of the vehicle 12 is determined to be obstructed by condensation 34. The first opacity threshold may be predetermined based on laboratory testing, dynamically determined based on factors like air temperature and humidity, and/or chosen by a driver of the vehicle 12. If the opacity of the rear window 44 determined at block 110 is less than the first opacity threshold, the method 100 enters a standby state at block 114. If the opacity of the rear window 44 determined at block 110 is greater than or equal to the first opacity threshold, the method 100 proceeds to block 116.

At block 116, the controller 14 activates the rear window heating element 20 to reduce the condensation 34 on the rear window 44 and thus decrease the opacity of the rear window 44. After block 116, the method 100 proceeds to enter a standby state at block 114.

At block 106, the interior camera 16 records an image of the side mirrors 46 of the vehicle 12. The method 100 then proceeds to block 118.

At block 118, the controller 14 processes the image of the side mirrors 46 to determine a reflectivity of the side mirrors 46. In an exemplary embodiment, to determine the reflectivity of the side mirrors 46, the controller 14 uses a machine learning algorithm. The machine learning algorithm is trained in a similar manner as described above. After block 118, the method 100 proceeds to block 120.

At block 120, the reflectivity of the side mirrors 46 determined at block 118 is compared to a reflectivity threshold. The reflectivity threshold is a reflectivity below which a side mirror 46 of the vehicle 12 is determined to be obstructed by condensation 34. The reflectivity threshold may be predetermined based on laboratory testing, dynamically determined based on factors like air temperature and humidity, and/or chosen by a driver of the vehicle 12. If the reflectivity of the side mirrors 46 determined at block 118 is greater than the reflectivity threshold, the method 100 enters a standby state at block 114. If the reflectivity of the side mirrors 46 determined at block 118 is less than or equal to the reflectivity threshold, the method 100 proceeds to block 122.

At block 122, the controller 14 activates the side mirror heating element 22 to reduce the condensation 34 on the side mirrors 46 and thus increase the reflectivity of the side mirrors 46. After block 122, the method 100 proceeds to enter a standby state at block 114.

At block 108, the interior camera 16 records an image of a first window of the vehicle 12, where the first window may be any one of the windows 28. In the example provided below, the first window is the front driver's side window 28a. The method 100 then proceeds to block 124.

At block 124, the controller 14 processes the image of the front driver's side window 28a to determine an opacity of the front driver's side window 28a and identify the first HVAC outlet 44a configured to provide airflow to the front driver's side window 28a. In an exemplary embodiment, to determine the opacity of the front driver's side window 28a and identify the first HVAC outlet 44a, the controller 14 uses a machine learning algorithm. The machine learning algorithm is trained in a similar manner as described above. After block 124, the method 100 proceeds to block 126.

At block 126, the opacity of the front driver's side window 28a determined at block 124 is compared to a second opacity threshold. The second opacity threshold may or may not be the same as the first opacity threshold. If the opacity of the front driver's side window 28a is less than the second opacity threshold, the method 100 enters standby state at block 114. If the opacity of the front driver's side window 28a is greater than or equal to the opacity threshold, the method 100 proceeds to block 128.

At block 128, the interior camera 16 records an image of a second window of the vehicle 12, where the second window is another one of the windows 28 other than the first window. In the example provided below, the second window is the front passenger's side window 28b. The method 100 then proceeds to block 130.

At block 130, the controller 14 processes the image of the front passenger's side window 28b to determine an opacity of the front passenger's side window 28b and identify the second HVAC outlet 44b configured to provide airflow to the front passenger's side window 28b. In an exemplary embodiment, to determine the opacity of the front passenger's side window 28b and identify the second HVAC outlet 44b, the controller 14 uses a machine learning algorithm. The machine learning algorithm is trained in a similar manner as described above. After block 130, the method 100 proceeds to block 132.

At block 132, the opacity of the front passenger's side window 28b determined at block 130 is compared to a third opacity threshold. The third may or may not be the same as the first and/or the second opacity thresholds. If the opacity of the front passenger's side window 28b is greater than or equal to the third opacity threshold, the method 100 proceeds to block 134. If the opacity of the front passenger's side window 28b is less than the third opacity threshold, the method 100 proceeds to block 136.

At block 134, In an exemplary embodiment, the blower 38 of the HVAC system 18 is adjusted to change the airflow over the front driver's side window 28a. In another exemplary embodiment, the temperature control 42 of the HVAC system 18 is adjusted to change the temperature of the air flowing over the front driver's side window 28a. In another exemplary embodiment, both the blower 38 and the temperature control 42 are adjusted. For example, the speed of the blower 38 and the temperature of the temperature control 42 may be increased, resulting in a higher volume of warmer air flowing over the front driver's side window 28a.

In an exemplary embodiment, the controller 14 executes the method 100 repeatedly (discussed in further detail below). The controller 14 saves a plurality of previous adjustments made to the blower 38 and the temperature control 42 in the media 26 of the controller 14. Therefore, the blower 38 and the temperature control 42 are adjusted based on the plurality of previous adjustments saved in the media 26 of the controller 14. After block 134, the method 100 proceeds to enter a standby state at block 114.

At block 136, the air baffles 40 of the HVAC system 18 are actuated to restrict airflow to the second HVAC outlet 44b and thus the front passenger's side window 28b. In an exemplary embodiment, the airflow to the second HVAC outlet 44b is restricted proportionally to the absolute value of the difference between the opacity of the front passenger's side window 28b determined at block 130 and the opacity threshold. After block 136, the method 100 proceeds to block 138.

At block 138, the air baffles 40 of the HVAC system 18 are actuated to increase airflow to the first HVAC outlet 44a and thus the front driver's side window 28a. In an exemplary embodiment, the airflow to the first HVAC outlet 44a is restricted proportionally to the absolute value of the difference between the opacity of the front driver's side window 28a determined at block 124 and the opacity threshold. After block 138, the method 100 proceeds to enter a standby state at block 114.

In an exemplary embodiment, the method 100 exits the standby state 114 and returns to the start block 102 repeatedly on a time interval, as determined, for example, by a timer of the controller 14. By executing the method 100 repeatedly, the operation of the system 10 is adjusted according to changes in the opacity of the windows 28.

The system and method of the present disclosure offer several advantages. These include increasing driver safety by reducing condensation 34 on the windows 28. By redirecting airflow from windows which are not obstructed by condensation 34 to windows which are obstructed by condensation 34, the airflow capacity of the HVAC system 18 is more effectively used to reduce obstructions to the driver's field of view. Furthermore, excess condensation 34 on certain windows of the vehicle 12 may be caused by the occupancy of the vehicle 12. For example, if the driver is the only occupant of the vehicle 12, the window nearest to the driver may become obstructed by excess condensation 34 due to moisture in the driver's breath. By redirecting airflow from windows which are not obstructed by condensation 34 to windows which are obstructed by condensation 34, the excess condensation 34 due to occupancy of the vehicle 12 may be mitigated. Furthermore, because the system 10 and method 100 allow for detection of obstructions to the driver's field of view, additional actions may be taken to improve driver safety while the system 10 and method 100 are being used to mitigate condensation 34. For example, if the system 10 and/or method 100 determine that the driver's view of a side mirror 46 is obstructed, an exterior camera (not shown) may be used to temporarily display a view from the perspective of the side mirror 46 on a human-machine interface (not shown) of the vehicle 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for detecting and mitigating window condensation for a vehicle, the system comprising:
    an interior camera;
    a heating, ventilation, and air conditioning (HVAC) system; and
    a controller in electrical communication with the interior camera and the HVAC system, wherein the controller is programmed to:
        determine an opacity of a first window of the vehicle using the interior camera;
        compare the opacity of the first window to a first opacity threshold; and
        adjust the HVAC system to decrease the opacity of the first window of the vehicle at least by increasing an airflow to the first window using the HVAC system in response to determining that the opacity of the first window is greater than or equal to the first opacity threshold, wherein to increase the airflow to the first window, the controller is further programmed to:
        calculate a first difference between the opacity of the first window and the first opacity threshold;
        determine an opacity of a second window of the vehicle;
        compare the opacity of the second window to a second opacity threshold;
        calculate a second difference between the opacity of the second window and the second opacity threshold;
        identify a first HVAC outlet, wherein the first HVAC outlet is configured to provide airflow to the first window;
        identify a second HVAC outlet, wherein the second HVAC outlet is configured to provide airflow to the second window; and
        increase an airflow to the first HVAC outlet using the HVAC system in response to determining that the opacity of the first window is greater than or equal to the first opacity threshold and that the opacity of the second window is less than the second opacity threshold;
        decrease an airflow to the second HVAC outlet using the HVAC system in response to determining that the opacity of the first window is greater than or equal to the first opacity threshold and that the opacity of the second window is less than the second opacity threshold;
        set the airflow to the first HVAC outlet proportionally to the first difference in response to determining that the opacity of the first window is greater than or equal to the first opacity threshold and that the opacity of the second window is greater than or equal to the second opacity threshold; and
        set the airflow to the second HVAC outlet proportionally to the second difference in response to determining that the opacity of the first window is greater than or equal to the first opacity threshold and that the opacity of the second window is greater than or equal to the second opacity threshold.

2. The system of claim 1, wherein to determine the opacity of the first window, the controller is further programmed to:
    record an image of the first window of the vehicle using the interior camera; and
    determine the opacity of the first window of the vehicle using the image and a machine learning algorithm.

3. The system of claim 1, wherein to adjust the HVAC system, the controller is further programmed to:
    monitor the opacity of the first window over time; and
    adjust at least one of: an air temperature of the HVAC system and an airflow within the HVAC system in response to determining that the opacity of the first window is increasing.

4. The system of claim 1, wherein to increase airflow to the first window, the controller is further programmed to:
    increase a fan speed of the HVAC system.

5. The system of claim 1, further comprising a rear window heating element, and wherein the controller is further programmed to:
  determine an opacity of a rear window of the vehicle using the interior camera;
  compare the opacity of the rear window to a third opacity threshold; and
  activate the rear window heating element in response to determining that the opacity of the rear window is greater than or equal to the third opacity threshold.

6. The system of claim 1, further comprising a side mirror heating element, and wherein the controller is further programmed to:
  determine a reflectivity of a side mirror of the vehicle using the interior camera;
  compare the reflectivity of the side mirror to a reflectivity threshold; and
  activate the side mirror heating element in response to determining that the reflectivity of the side mirror is less than or equal to the reflectivity threshold.

7. A method for detecting and mitigating window condensation for a vehicle, the method comprising:
  determining an opacity of a first window using an interior camera;
  comparing the opacity of the first window to a first opacity threshold; and
  adjusting an HVAC system to decrease the opacity of the first window at least by increasing an airflow to the first window using the HVAC system in response to determining that the opacity of the first window is greater than or equal to the first opacity threshold, wherein increasing the airflow to the first window further comprises:
    calculating a first difference between the opacity of the first window and the first opacity threshold;
    determining an opacity of a second window;
    comparing the opacity of the second window to a second opacity threshold;
    calculating a second difference between the opacity of the second window and the second opacity threshold;
    identifying a first HVAC outlet, wherein the first HVAC outlet is configured to provide airflow to the first window;
    identifying a second HVAC outlet, wherein the second HVAC outlet is positioned provide airflow to the second window;
    increasing an airflow to the first HVAC outlet using the HVAC system in response to determining that the opacity of the first window is greater than or equal to the first opacity threshold and that the opacity of the second window is less than the second opacity threshold;
    decreasing an airflow to the second HVAC outlet using the HVAC system in response to determining that the opacity of the first window is greater than or equal to the first opacity threshold and that the opacity of the second window is less than the second opacity threshold;
    setting the airflow to the first HVAC outlet proportionally to the first difference in response to determining that the opacity of the first window is greater than or equal to the first opacity threshold and that the opacity of the second window is greater than or equal to the second opacity threshold; and
    setting the airflow to the second HVAC outlet proportionally to the second difference in response to determining that the opacity of the first window is greater than or equal to the first opacity threshold and that the opacity of the second window is greater than or equal to the second opacity threshold.

8. The method of claim 7, wherein determining the opacity of the first window further comprises:
  recording an image of the first window using the interior camera; and
  determining the opacity of the first window using the image and a machine learning algorithm.

9. The method of claim 7 further comprising:
  determining an opacity of a rear window of the vehicle using the interior camera;
  comparing the opacity of the rear window to a third opacity threshold;
  activating a rear window heating element in response to determining that the opacity of the rear window is greater than or equal to the third opacity threshold;
  determining a reflectivity of a side mirror of the vehicle using the interior camera;
  comparing the reflectivity of the side mirror to a reflectivity threshold; and
  activating a side mirror heating element in response to determining that the reflectivity of the side mirror is less than or equal to the reflectivity threshold.

10. A system for detecting and mitigating window condensation for a vehicle, the system comprising:
  an interior camera;
  a heating, ventilation, and air conditioning (HVAC) system;
  a rear window heating element;
  a side mirror heating element; and
  a controller in electrical communication with the interior camera, the HVAC system, the rear window heating element, and the side mirror heating element, wherein the controller is programmed to:
    record an image of a first window of the vehicle using the interior camera;
    determine an opacity of the first window of the vehicle using the image and a machine learning algorithm;
    compare the opacity of the first window to a first opacity threshold;
    adjust the HVAC system to decrease the opacity of the first window of the vehicle in response to determining that the opacity of the first window is greater than or equal to the first opacity threshold, wherein to adjust the HVAC system to decrease the opacity of the first window, the controller is further programmed to:
      calculate a first difference between the opacity of the first window and the first opacity threshold;
      determine an opacity of a second window of the vehicle;
      compare the opacity of the second window to a second opacity threshold;
      calculate a second difference between the opacity of the second window and the second opacity threshold;
      identify a first HVAC outlet, wherein the first HVAC outlet is configured to provide airflow to the first window;
      identify a first HVAC outlet, wherein the first HVAC outlet is configured to provide airflow to the first window;
      identify a second HVAC outlet, wherein the second HVAC outlet is positioned provide airflow to the second window;
      increase an airflow to the first HVAC outlet using the HVAC system in response to determining that the opacity of the first window is greater than or equal to the first opacity threshold and that the opacity of the second window is less than the second opacity threshold;
decrease an airflow to the second HVAC outlet using the HVAC system in response to determining that the opacity of the first window is greater than or equal to the first opacity threshold and that the opacity of the second window is less than the second opacity threshold;
set the airflow to the first HVAC outlet proportionally to the first difference in response to determining that the opacity of the first window is greater than or equal to the first opacity threshold and that the opacity of the second window is greater than or equal to the second opacity threshold; and
set the airflow to the second HVAC outlet proportionally to the second difference in response to determining that the opacity of the first window is greater than or equal to the first opacity threshold and that the opacity of the second window is greater than or equal to the second opacity threshold;
determine an opacity of a rear window of the vehicle using the interior camera;
compare the opacity of the rear window to a third opacity threshold;
activate the rear window heating element in response to determining that the opacity of the rear window is greater than or equal to the third opacity threshold;
determine a reflectivity of a side mirror of the vehicle using the interior camera;
compare the reflectivity of the side mirror to a reflectivity threshold; and
activate the side mirror heating element in response to determining that the reflectivity of the side mirror is less than or equal to the reflectivity threshold.

* * * * *